United States Patent
Song et al.

(10) Patent No.: US 11,765,649 B1
(45) Date of Patent: Sep. 19, 2023

(54) CLOSED SUBSCRIBER GROUP SETUP OF SHARED BASE STATIONS BASED ON PUBLIC LAND MOBILE NETWORK CONFIGURATION

(71) Applicant: Sprint Spectrum L.P., Overland Park, KS (US)

(72) Inventors: Minho Song, Ashburn, VA (US); Sanghoon Sung, Ashburn, VA (US); Hung Bui, Arcola, VA (US); Don Nguyen, Grand Prairie, TX (US)

(73) Assignee: Sprint Spectrum LLC, Bellevue, WA (US)

( * ) Notice: Subject to any disclaimer, the term of this patent is extended or adjusted under 35 U.S.C. 154(b) by 230 days.

(21) Appl. No.: 17/119,005

(22) Filed: Dec. 11, 2020

(51) Int. Cl.
*H04W 48/18* (2009.01)
*H04W 48/02* (2009.01)
*H04W 84/04* (2009.01)
*H04W 8/18* (2009.01)
*H04W 48/20* (2009.01)

(52) U.S. Cl.
CPC ........... *H04W 48/18* (2013.01); *H04W 8/186* (2013.01); *H04W 48/02* (2013.01); *H04W 48/20* (2013.01); *H04W 84/045* (2013.01)

(58) Field of Classification Search
CPC ..... H04W 48/18; H04W 8/186; H04W 48/02; H04W 48/20; H04W 84/045
See application file for complete search history.

(56) References Cited

U.S. PATENT DOCUMENTS

| 9,832,719 | B2* | 11/2017 | Horn | H04W 8/065 |
| 10,701,608 | B2* | 6/2020 | Kakinada | H04W 36/26 |
| 11,197,211 | B1* | 12/2021 | Panchai | H04W 4/022 |
| 2012/0058792 | A1* | 3/2012 | Liang | H04W 8/18 |
| | | | | 455/509 |

(Continued)

OTHER PUBLICATIONS

3GPP TS 22.220 V1 5.0.0 (Jul. 2019); 3rd Generation Partnership Project; Technical Specification Group Services and System Aspects; Service requirements for Home Node B (HNB) and Home eNode B (HeNB) (Release 15).

(Continued)

*Primary Examiner* — Steven S Kelley
(74) *Attorney, Agent, or Firm* — McDonnell Boehnen Hulbert & Berghoff LLP

(57) ABSTRACT

A method and system for a base station (BS) configured for sharing among a plurality of public land mobile networks (PLMNs), and for providing open radio access and/or closed subscriber group (CSG) radio access for user equipment devices (UEs) served. The BS may make a determination of which PLMNs have enabled CSG and which have not, and may transmit a request to a core network of each PLMN to set up an interface connection with each. Based on the determination, the request may either include information for configuring CSG radio access, or information for configuring only open radio access. For each PLMN having CSG enabled, the interface connection may be established for CSG radio access for UEs associated with PLMNs having CSG enabled. For each PLMN not having CSG enabled, the interface connection may be established for only open radio access for UEs associated with PLMNs without CSG enabled.

16 Claims, 6 Drawing Sheets

(56) References Cited

U.S. PATENT DOCUMENTS

| | | | | |
|---|---|---|---|---|
| 2012/0157095 | A1* | 6/2012 | Fodor | H04W 4/08 |
| | | | | 455/434 |
| 2013/0003697 | A1* | 1/2013 | Adjakple | H04W 48/16 |
| | | | | 370/331 |
| 2015/0072686 | A1* | 3/2015 | Xu | H04W 36/0061 |
| | | | | 455/436 |
| 2016/0219605 | A1* | 7/2016 | Karlsson | H04W 72/56 |
| 2017/0048692 | A1* | 2/2017 | Huang | H04W 36/08 |
| 2018/0146467 | A1* | 5/2018 | Kim | H04W 80/02 |
| 2019/0110244 | A1* | 4/2019 | Shih | H04W 48/16 |
| 2019/0261264 | A1* | 8/2019 | Lou | H04W 48/18 |
| 2019/0394816 | A1* | 12/2019 | Kim | H04W 76/10 |
| 2021/0136658 | A1* | 5/2021 | Rönneke | H04W 8/02 |

OTHER PUBLICATIONS

3GPP TS 36.300 V16.0.0 (Dec. 2019); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16).

3GPP TS 36.331 V15.8.0 (Dec. 2019); 3rd Generation Partnership Project; Technical Specification Group Radio Access Network Evolved Universal Terrestrial Radio Access (E-UTRA); Radio Resource Control (RRC); Protocol specification (Release 15).

CBRS Alliance & ATIS Shared HNI Webinar Nov. 6, 2018; retrieved from https://www.cbrsalliance.org/resource/cbrs-shared-hni-webinar/.

* cited by examiner

CLOSED SUBSCRIBER GROUP SETUP OF SHARED BASE STATIONS BASED ON PUBLIC LAND MOBILE NETWORK CONFIGURATION

BACKGROUND

Unless otherwise indicated herein, the materials described in this section are not prior art to the claims and are not admitted to be prior art by inclusion in this section.

A cellular communication system operated by a wireless service provider typically includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, the system could include a core network having a user-plane subsystem that provides connectivity between the access nodes and various application servers and/or transport networks, and a control-plane subsystem for managing UE and core-network service. With this arrangement, a UE within coverage of the system could engage in air-interface communication with an access node and could thereby communicate via the access node and core network with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on one or more radio-frequency (RF) carriers. And on the downlink and uplink, the air interface provided by an access node on a given carrier could be configured to define physical resources for carrying information, including control-plane signaling and user-plane traffic, wirelessly between the access node and UEs.

When a UE first enters into coverage of such a system, the UE could detect coverage of an access node and then engage in random-access signaling and connection signaling with the access node to establish an air-interface connection (e.g., Radio Resource Control (RRC) connection) defining a logical tunnel for carrying communications wirelessly between the UE and the access node. Further, the UE could engage in attachment or registration signaling via the access node with a core-network controller. And the core-network controller could responsively engage in signaling to set up for the UE one or more default bearers each defining a logical packet tunnel extending between the UE and the user-plane subsystem of the core network, to enable the UE to engage in packet-data communications through the core network.

In a typical market area, wireless service providers may operate radio access networks (RANs) each arranged to UEs with wireless communication service. Each such a RAN may include a number of base stations that radiate to define wireless coverage areas in which to serve UEs according to one or more RATs. With this arrangement, a UE within coverage of the RAN may engage in air interface communication with a base station and may thereby communicate via the base station with various remote network entities or with other UEs served by the base station or by other base stations.

A wireless service provider may operate one or more such RANs as a public land mobile network (PLMN) for serving UEs. For example, a service provider may operate a LTE RAN as a PLMN for serving UEs with LTE service, and/or the service provider may operate a 5G NR RAN as a PLMN for serving UEs with 5G NR service. In general, each such PLMN may have a respective PLMN identifier (PLMNid), and UEs may subscribe to service of the PLMN be provisioned with data indicating that PLMNid.

In addition to operating a RAN as its own PLMN, a wireless service provider may also operate a RAN on behalf of one or more other wireless service providers known as "mobile virtual network operators" (MVNOs), to allow the MVNOs to provide wireless communication service without the need to build out RANs of their own. (In practice, an MVNO may be a different company than the actual RAN operator or may be the same company as the actual RAN operator.) In this arrangement, the MVNO may be considered to provide an MVNO PLMN, which may have its own PLMNid. However, the wireless service provider would in fact be operating its RAN not only as its own PLMN but also as the MVNO's PLMN. In addition, a wireless service provider that functions as an MVNO using the RAN of another service provider may also operate its own RAN in certain locations, and may in fact host service for the other service provider in certain locations, such that the other service provider would then function as an MVNO in those locations.

Still further, a wireless service provider may have roaming agreements with other wireless service providers, to provide a wider range of coverage for mobile terminals. In such arrangements, a mobile terminal that subscribes to service of a service provider's PLMN but is not within sufficient coverage of that PLMN may instead be served by another service provider's PLMN, and the service providers may work with each other to account for the costs of that roaming service.

In practice, base stations of a given RAN may therefore provide service for possibly multiple PLMNs. For instance, a base station operated by a wireless service provider may provide service for a PLMN of that service provider and may also provide service for a PLMN of an MVNO, and perhaps for a PLMNs of various roaming partners.

OVERVIEW

The arrangement in which a RAN serves multiple PLMN, such as in a MVNO scenario, is sometimes referred to as "RAN sharing." In a typical RAN sharing deployment, a shared RAN may be connected to the core network of each PLMN that shares the RAN by way of a control-plane element for signaling and control operations, such as a switch or a mobility management entity (MME), and to a user-plane element, such as a serving gateway (SGW) for transport of user data on one or more traffic channels, for example. In this way, RAN sharing may essentially replicate the RAN-core interfaces of a single PLMN across the multiple PLMNs that share the RAN. When each PLMN represents a distinct network operator, this arrangement may customarily be referred to as "multiple operator core network" or MOCN.

In accordance with the MOCN model of RAN sharing, the RAN, or a base station of the RAN, will broadcast system information that includes a list of PLMNids of the PLMNs that share the RAN (or base station). A UE may seek radio access via the shared RAN if the UE is associated with one of the PLMNs. The UE may determine that it is "eligible" for seeking access by determining that the PLMNid of the UE's serving PLMN (the UE typically being provisioned with the identity of its serving PLMN) matches one of the PLMNids in the broadcast list. When the RAN receives a request from a UE for access (e.g., a request to "attach" to the network), the RAN will engage with the core network of the UE's PLMN to carry out control-plane signaling for requesting and establishing necessary control-plane and/or user-plane interfaces for supporting service for the UE. Similar operations may be carried out for multiple UEs served by any of the multiple PLMNs that share the RAN.

Another mode of radio access, separate and apart from RAN sharing, enables a RAN or base station of a RAN to be configured to limit access to a group of specific UEs from among all those that are otherwise served by a particular PLMN. The specific UEs are considered members or subscribers of the group, and the group may be designated as a "closed subscriber group" or CSG. Taking LTE as an example, CSG may be operated in a "closed" mode, in which access is strictly limited to UEs that are group members, or "hybrid" mode, in which UEs that are not group members, but are served by the PLMN, may gain access, but at lower priority than group members. To set up CSG in either mode, a base station may carry out particular initial signaling with the core network of the PLMN to coordinate various aspects of CSG configuration. In operation, the base station providing CSG access may broadcast system information that includes, in addition to a PLMNid, a CSG ID. Then, if CSG closed mode access is being used, only UEs associated with the PLMN and having a matching CSG ID may seek radio access from the base station. If hybrid mode access is being used, any UE associated with the PLMN may seek access, but may only receive lower priority service.

A typical usage scenario for CSG may be a "small cell," "micro base station," or "femto base station," such as might be deployed in residential setting or small area, such as a dwelling space, cafe, or other small enterprise. Small base stations may not typically be used in RAN sharing scenarios, but it not ruled out, and could become more common depending on locale and/or service model, for example. For example, a small cell deployed in a shopping mall to enhance or supplement cellular wireless coverage may be configured for RAN sharing in order to provide UEs access to multiple network operators. At the same time, the base station could be configured for hybrid CSG access to serve a group of UEs associated with mall operations. In this scenario, all non-group UEs could gain at least lower priority access. Other scenarios are possible as well.

One issue that can arise when both RAN sharing and CSG (closed or hybrid) are used together is that, according to industry standards developed for these operational modes, the system information that is broadcast for RAN sharing and for CSG includes a list of PLMNids, but only a single CSG ID. As a result, the PLMNs that share the base station may need to engage in coordination and/or negotiation to set a common CSG ID. This process may be cumbersome and complicated, involving multiple control and/or management entities in the core networks of each PLMN. In conventional operation, the coordination/negotiation procedures may be invoked when a RAN-shared base station first establishes control-plane interfaces with each of the PLMNs that share it.

Another form of shared radio access that involves making a previously restricted radio frequency (RF) band available for cellular service is "citizens broadband radio service," or CBRS. Under CBRS, currently authorized or "incumbent" users of the RF band may be guaranteed continued interference-free access, while two new tiers of access may be granted to qualified applicants. Specifically, "priority access licenses" or PALs may be assigned in a competitive bidding process, and "general authorized access" may be granted access to unassigned portions of the band and/or on an opportunistic basis. CBRS provides for a shared PLMNid that can be used for operators that do not have their own PLMNid. In this case, the CSG ID is repurposed as a network ID, allowing operators to be distinguished while otherwise sharing a common PLMNid. As such, CBRS presents a similar issue of RAN sharing with CSG. Namely, causing inter-operator coordination of CSG ID in RAN sharing scenarios.

As mentioned above and described in more detail below, the initial communications from the base station can include parameters relating to CSG, and may thereby trigger the PLMNs to coordinate/negotiate a common CSG ID and other aspects of CSG operation, even if one or more of the PLMNs have not even enabled CSG. For such PLMNs, the coordination/negotiation procedures can be result wasted efforts and wasted resources, and may further complicate the process for the PLMNs that have enabled CSG. Unfortunately, conventional procedures relating to RAN sharing and CSG do not allow a base station to avoid causing these potentially unnecessary operations. Accordingly, methods and systems are disclosed herein that provide for enabling a base station to selectively configure CSG in a RAN-sharing arrangement by taking account of which PLMNs have enabled CSG and which have not.

Accordingly, in one respect, disclosed is a method operable by a base station (BS) configured for sharing among a plurality of public land mobile networks (PLMNs), and further configured for providing at least one of open radio access or closed subscriber group (CSG) radio access for one or more user equipment devices (UEs) within its wireless coverage area. The method may entail: making a first determination of which PLMNs of the plurality have enabled CSG and which have not; transmitting a respective request to a respective core network of each respective PLMN of the plurality to set up a respective interface connection between the base station and the respective core network, wherein, based on the first determination, the respective request includes information for configuring CSG radio access if the respective PLMN has enabled CSG, and wherein, based on the first determination, the respective request includes information for configuring only open radio access if the respective PLMN has not enabled CSG; for each respective PLMN having CSG enabled and whose core network responds affirmatively to the respective request, establishing the respective interface connection so as to be configured for CSG radio access for UEs associated with the respective PLMN with CSG enabled; and for each respective PLMN not having CSG enabled and whose core network responds affirmatively to the respective request, establishing the respective interface connection so as to be configured for only open radio access for UEs associated with the respective PLMN with CSG not enabled.

In another respect, disclosed is a base station (BS) configured for sharing among a plurality of public land mobile networks (PLMNs), and further configured for providing at least one of open radio access or closed subscriber group (CSG) radio access for one or more user equipment devices (UEs) within its wireless coverage area. The base station may include an antenna structure configured to communicate over an air interface with the one or more UEs; one or more processors; and memory storing instructions that, when executed by the one or more processors, cause the base station to carry out operations including: making a first determination of which PLMNs of the plurality have enabled CSG and which have not; transmitting a respective request to a respective core network of each respective PLMN of the plurality to set up a respective interface connection between the base station and the respective core network, wherein, based on the first determination, the respective request includes information for configuring CSG radio access if the respective PLMN has enabled CSG, and wherein, based on the first determination, the respective request includes information for configuring only open radio access if the respective PLMN has not enabled CSG; for each respective PLMN having CSG enabled and whose core network responds affirmatively to the respective request, establishing the respective interface connection so as to be configured for CSG radio access for UEs associated with the respective PLMN with CSG enabled; and for each respective PLMN not having CSG enabled and whose core network responds affirmatively to the respective request, establishing the respective interface connection so as to be configured for only open radio access for UEs associated with the respective PLMN with CSG not enabled.

Still further, disclosed is a non-transitory computer-readable medium having instructions stored thereon that when executed by one or more processors of a base station (BS) configured for sharing among a plurality of public land mobile networks (PLMNs), and further configured for providing at least one of open radio access or closed subscriber group (CSG) radio access for one or more user equipment devices (UEs) within its wireless coverage area, cause the base station to carry out operations including: making a first determination of which PLMNs of the plurality have enabled CSG and which have not; transmitting a respective request to a respective core network of each respective PLMN of the plurality to set up a respective interface connection between the base station and the respective core network, wherein, based on the first determination, the respective request includes information for configuring CSG radio access if the respective PLMN has enabled CSG, and wherein, based on the first determination, the respective request includes information for configuring only open radio access if the respective PLMN has not enabled CSG; for each respective PLMN having CSG enabled and whose core network responds affirmatively to the respective request, establishing the respective interface connection so as to be configured for CSG radio access for UEs associated with the respective PLMN with CSG enabled; and for each respective PLMN not having CSG enabled and whose core network responds affirmatively to the respective request, establishing the respective interface connection so as to be configured for only open radio access for UEs associated with the respective PLMN with CSG not enabled.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Figure 1:
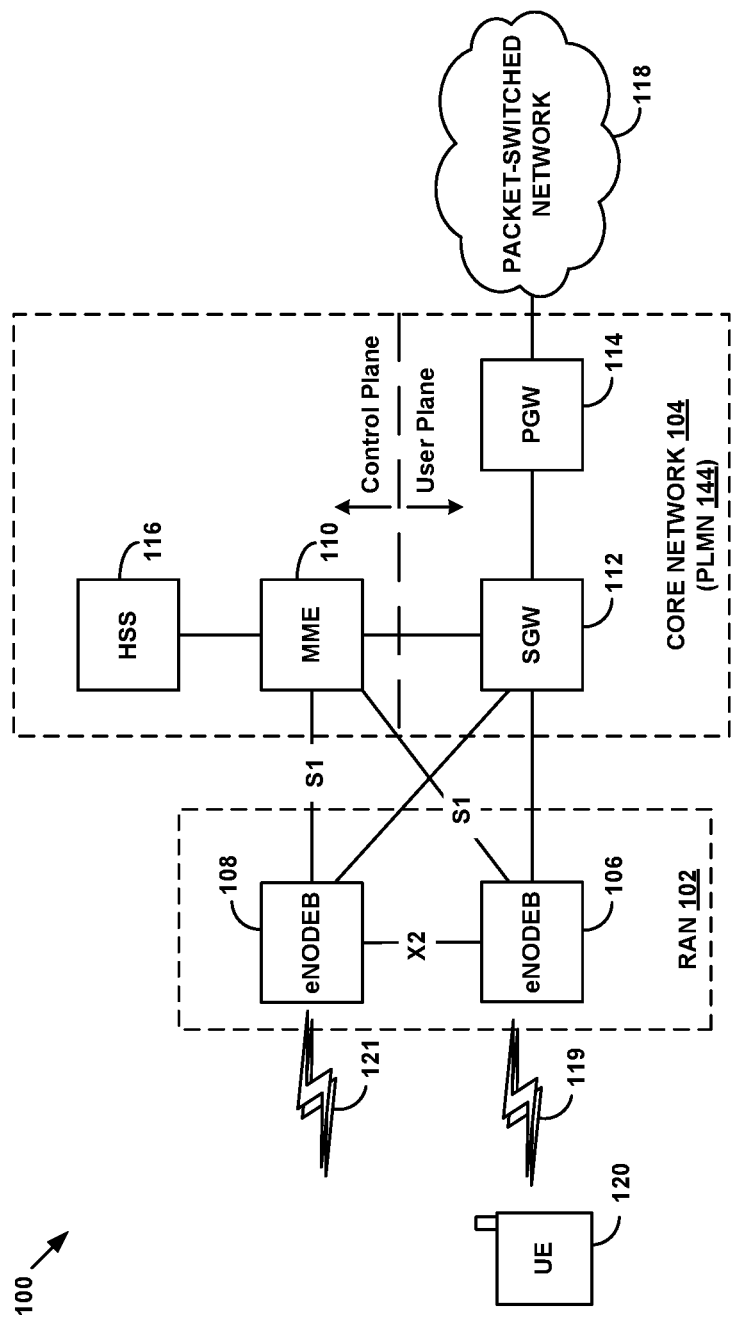
FIG. 1 is a simplified block diagram of an example communication system in which the present method can be implemented, in accordance with example embodiments.

Referring to the drawings, FIG. 1 is a simplified block diagram of an example communication system 100 in which the present method can be implemented. For purposes of illustration, the example communication system is taken to be an LTE network that includes an LTE RAN 102 and a core network 104 of PLMN 144. In an example arrangement, the communication system 100 may be operated by a wireless service provider that is licensed to operate the PLMN 144 for providing communication service to mobile terminals, referred to in an LTE network as UEs.

By way of example, the RAN 102 includes two base stations 106 and 108, referred to as eNodeBs in LTE. The core network 104 includes MME 110 having a communication interface with the eNodeB, and an SGW 112 having communication interfaces with the MME and the eNodeBs, and a PGW 114 having a communication interface with the SGW and providing connectivity with a packet-switched network 118. As further shown, the MME 110 has a communication interface with an HSS 116 to facilitate querying for authorization to serve various mobile terminals.

Figure 4:
FIG. 4 is an example representation of a RAN-sharing configuration table, in accordance with example embodiments.

In accordance with LTE network architecture, the MME 110 and HSS 116 are part of a control plane, while the SGW 112 and PGW are part of a user plane, as indicated in FIG. 4. The arrangement of a control plane and user plane is not necessarily unique or exclusive to LTE, and other communication networks may use similarly defined architectures. As such, the methods and systems disclosed herein by way of example in terms of LTE are not limited to LTE, and may be implemented and/or carried out in other types of networks, such as, and without limitation, 5G networks.

As shown, the eNodeBs 106 and 108 are interconnected by an X2 interface, and each is then connected on the control plane to the MME 110 by a respective S1 interface, configured for carrying signaling and control messages and exchanges with the core network 104. Each eNodeB also has a respective user-plane connection to the SGW 112 for carrying used data traffic, for example. Each base station (eNodeB) is shown radiating to define one or more coverage areas 119 and 121, each of which may operate on a particular frequency band for instance.

Although the base stations and network infrastructure are shown as separate blocks in the figure, it should be understood that components of the system may be co-located and/or integrated together in various ways. For example, two or more base stations could share an antenna tower. And as another example, the supporting network infrastructure could be integrated with one or more of the base stations. Further, a base station may be a macro base station that deployed as part of a network operator's infrastructure, and configured for providing coverage in one or more cells, sectors, or zones over a relatively large area (e.g., a portion of a metropolitan area). Alternatively, a base station could be a micro or femto base station owned by a private user, and having a small footprint, such as a table top device or small area distribution of antenna elements (e.g., having various locations throughout a single building structure, mall, airport, or sports stadium). Other variations are possible as well.

FIG. 1 then further depicts an example UE 120 positioned in a coverage area 119 of eNodeB 106. In practice, UE 120 may have a subscription with PLMN 144. For instance, the UE 120 may subscribe (of a user/owner of the UE may subscribe) to service of the PLMN 144 provided by the wireless service provider that operates the illustrated base stations. In practice, the UE 120 may be provisioned with data that specifies the PLMNid of the PLMN to which the UE subscribes—PLMN 144 in the current illustration. By way of example, the UE may maintain in data storage an identifier that uniquely identifies the UE and that includes an indication of the PLMNid to which the UE subscribes, such as an international mobile subscriber identity (IMSI) that includes as its first six digits the PLMNid. Further, the UE may be provisioned with program logic that causes the UE to provide an indication of its PLMNid to base station (eNodeB) when the UE seeks to be served by the base station, such as to provide the base station with the UE's IMSI including the UE's PLMNid.

In practice, a communication system may operate in accordance with one or more particular radio access technologies, such as one of those noted above. In the example illustrated in FIG. 1, the system 100 is taken to be an LTE RAN. As another example, the system may be a CDMA RAN, in which case each base station may be a CDMA base station known as a base transceiver station (BTS), and the supporting network infrastructure may include elements such as a base station controller (BSC), radio network controller (RNC), mobile switching center (MSC), and packet data serving node (PDSN). Other examples are possible as well. In more general terms, a user device may be referred to a mobile terminal, and may access the network by way of a base station.

Turning, momentarily, to a more general description, the air interface of each coverage area in the example communication system may define a downlink or forward link for carrying communications from the serving base station to served mobile terminals, and an uplink or reverse link for carrying communications from served mobile terminals to the serving base station. Depending on the radio access technology, these air interface links may take various forms and may define various channels for carrying particular data, such as control data and bearer traffic for instance.

By way of example, each coverage area may define a pilot channel or reference channel on which the base station may broadcast a pilot signal or reference signal that mobile terminals may detect as an indication of coverage and may measure to determine coverage strength. Further, each coverage area may define a control channel that carries various overhead messages, such as system information blocks or the like, specifying characteristics and operational parameters of the coverage area. Each coverage area may also have a respective coverage area identifier, such as a Physical Cell Identity (PCI) and/or pseudo-noise offset (PN offset) for instance, which could be indicated by the pilot or reference signal or specified in another overhead broadcast message or signal.

When a mobile terminal first powers on or enters into coverage of the network, the mobile terminal may scan for pilot or reference signals and determine for each detected signal a signal level (e.g., receive strength or signal-to-noise ratio) and corresponding coverage area identifier (e.g., PCI or PN offset). The mobile terminal may thereby identify a coverage area providing the strongest pilot or reference signal and may engage in a process to register with the network by transmitting an attach request (registration request) to the base station that is providing that signal.

In the attach request, or in some other manner, the mobile terminal may convey to the base station an indication of a PLMN to which the mobile terminal subscribes. For instance, the mobile terminal may include in the attach request its IMSI, which as noted above may specify the mobile terminal's PLMNid. And the base station may then forward the attach request with that PLMNid to a centralized network entity such as an MME or MSC to facilitate authorization of mobile terminal for service.

At the time of attachment or thereafter, the mobile terminal may also engage in signaling with the base station to enter into a connected mode, in which the base station has assigned to the mobile terminal a radio link connection over which the mobile terminal can engage in bearer communication with the base station and thereby with various other entities. In that mode, for instance, the mobile terminal may engage in packet data communications on the Internet and/or a voice call on the PSTN.

While in the connected mode, the mobile terminal may then continue to regularly scan pilot or reference signals, from both the coverage area serving the mobile terminal and from various other coverage areas. Alternatively or additionally, the base station may direct the mobile terminal to engage in such scanning from time to time. As the mobile terminal carries out this scanning, the mobile terminal may thus again determine the signal level of various coverage areas, and the identities of those coverage areas.

Further, the mobile terminal may from time to time in the connected mode transmit to its serving base station a measurement report that specifies the signal level of each coverage area detected by the mobile terminal. In particular, the measurement report may specify each detected coverage area (e.g., by coverage area identifier) and the signal level (e.g., reference signal receive strength, or signal-to-noise ratio) of the coverage area as determined by the mobile terminal. In practice, a given measurement report may thus include such information for the mobile terminal's currently serving coverage area and may also include such information for each of one or more other coverage areas detected by the mobile terminal.

When the serving base station receives such a measurement report from the mobile terminal, if the measurement report specifies signal level of another coverage area, the base station or other network node may engage in a process to decide whether to trigger handoff of the mobile device to the other coverage area. In general, this process may involve evaluating the reported signal level of the other coverage area to determine whether it is sufficiently strong itself and/or whether it is sufficiently stronger than the reported signal level of the serving coverage area. Further, the process may involve consideration of other factors as well, such as load and backhaul capacity for instance.

If the serving base station decides to trigger handoff of the mobile terminal to a coverage area of another base station, the serving base station may transmit to that other base station, either over a direct inter-base-station interface or through the one or more other network entities, a handoff request message that requests the other base station to serve the mobile terminal. The other base station may then engage in a handoff preparation process to establish a radio link for the mobile terminal, and the mobile terminal may then ultimately transition to be served instead by that other base station.

Returning again to the example of LTE illustrated in FIG. 1, when a UE 120 enters into coverage of eNodeB 106, the UE may transmit to the eNodeB an attach request that specifies the UE's IMSI including the UE's PLMNid. The eNodeB may forward the attach request along to the MME, and the MME may then interact with the HSS to further validate the mobile terminal for service and, if appropriate, may work to set up one or more user-plane bearers between the mobile terminal and the PGW, so that the eNodeB may then serve the mobile terminal.

Furthermore, when a UE is served by a source eNodeB, and eNodeB 106 receives from that source eNodeB a handoff request for the mobile terminal (e.g., via an inter-eNodeB X2 interface), that handoff request may carry an indication of the UE's PLMNid. In that case, eNodeB 106 may then similarly read the mobile terminal's PLMNid and may continue with handoff processing, such as by sending to the source eNodeB a positive handoff response and proceeding with additional preparation for handoff of the UE to be served by the eNodeB.

Figure 2:
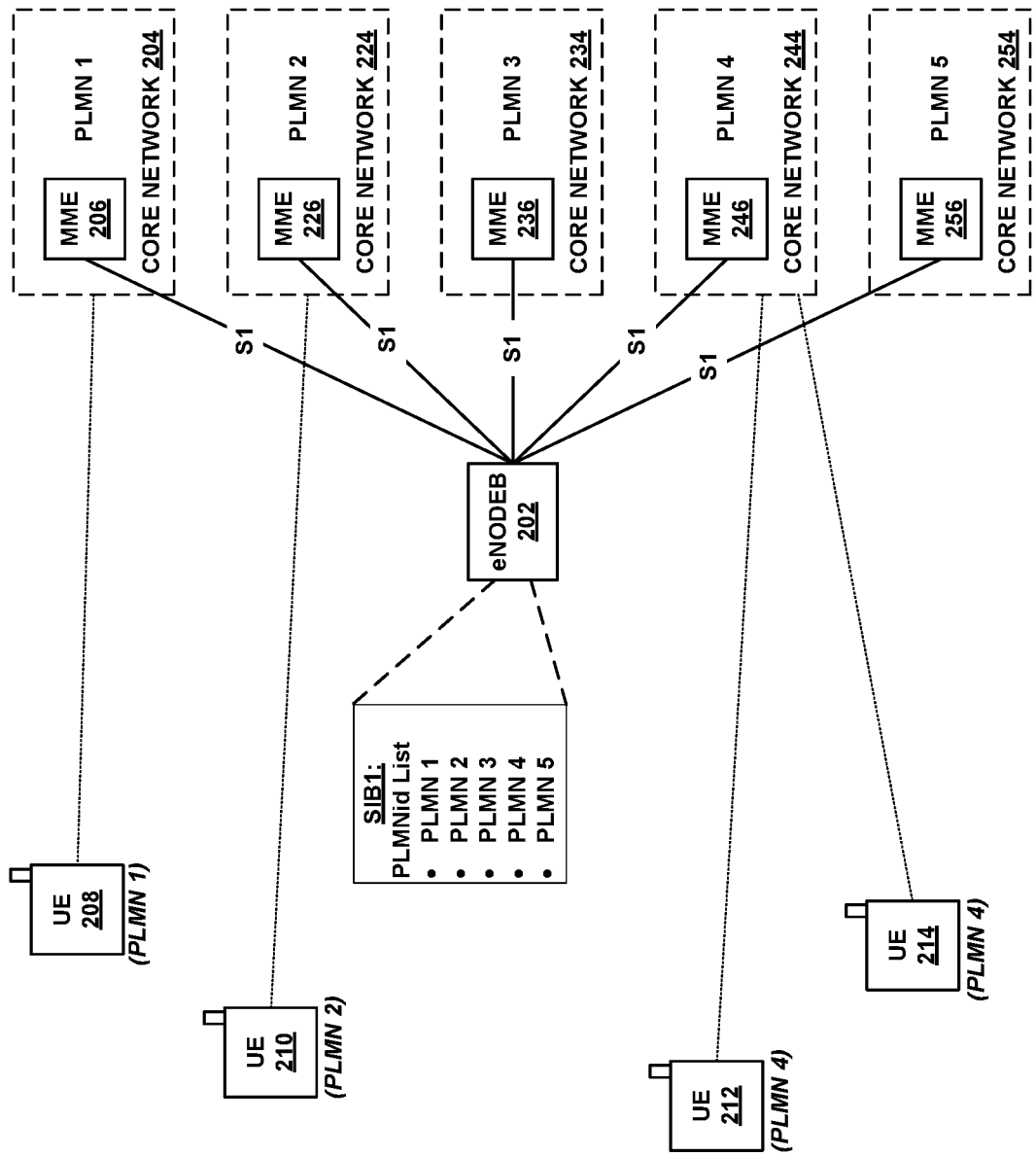
FIG. 2 is a simplified block diagram of an example communication system illustrating RAN sharing, in which the present method can be implemented, in accordance with example embodiments.

FIG. 2 illustrates an example of RAN sharing in accordance with a MOCN arrangement, in which respective core networks 204, 224, 234, 244, and 254 of multiple PLMNs, PLMN 1, PLMN 2, PLMN 3, PLMN 4, and PLMN 5, may share the radio access resources of a single RAN to provide cellular wireless service to respective subscribers. In the example, the RAN is represented as a single eNodeB 202, although the RAN and the sharing it provides could be implemented by multiple eNodeBs. As described above, the actual RAN infrastructure could be owned and operated by just one of the PLMN operators, and made available to the others by way of a service agreement, for example. Alternatively, a single eNodeB could be a privately-owned small base station, such as a "home eNodeB" or HeNB. Further, it should be understood that the shared eNodeB 202 may represent only a one element of a given PLMN's radio access infrastructure, and any one or more of the PLMNs could be connected to other dedicated and/or shared RANs or eNodeBs that provide radio access to the PLMNs' respective subscribers, for example.

In the example illustrated, each core network is shown to have a respective MME that connects on the control plane to the eNodeB 202 via respective S1 interfaces. Thus, core network 204 includes MME 206; core network 224 includes MME 226; core network 234 includes MME 236; core network 244 includes MME 246; and core network 254 includes MME 256. It will be appreciated that each core network would include other entities as well, on both the user plane and the control plane, such as those shown in FIG. 1.

By way of example, four UEs, 208, 210, 212, and 214, are shown as being served by the eNodeB 202. Under LTE, as well as other network systems, the eNodeB will broadcast on a control channel various system parameters in one or more "system information blocks" or SIBs. In particular, for the MOCN model of RAN sharing, the eNodeB will broadcast a list of PLMNids in system information block 1, or SIB1. This is indicated in FIG. 2 by the block labeled "SIB1" and containing a list of the five PLMNs that are sharing the eNodeB.

In operation, a UE within the coverage area of the eNodeB will received the SIB1 broadcast, and determine whether or not it may request to attach to one of the listed PLMNs based on whether or not its serving PLMN is among those listed. If the UE subscribes to one of the listed PLMNs, then it may request to attach to its serving PLMN; otherwise the UE should refrain from requesting to attach. By way of illustration and example in FIG. 2, UE 208 subscribes to PLMN 1, and is shown as having an attachment (depicted as a dotted line) to the core network 204. Similarly, UE 210 subscribes to PLMN 2, and is shown as having an attachment to the core network 224; and both UEs 212 and 214 are evidently subscribers to PLMN 4, both UEs shown as having connections to core network 244. In establishing these network attachments, the eNodeB 202 may confirm that each UE is eligible to make an attachment request by checking the UE's PLMNid against a locally stored PLMNid list. If the UE's PLMN is in the local last, the eNodeB may then direct an attachment request or related signaling to the appropriate MME based on the PLMNid in the UE's request. Otherwise, the eNodeB may refuse the UE's attachment request.

Figure 3:
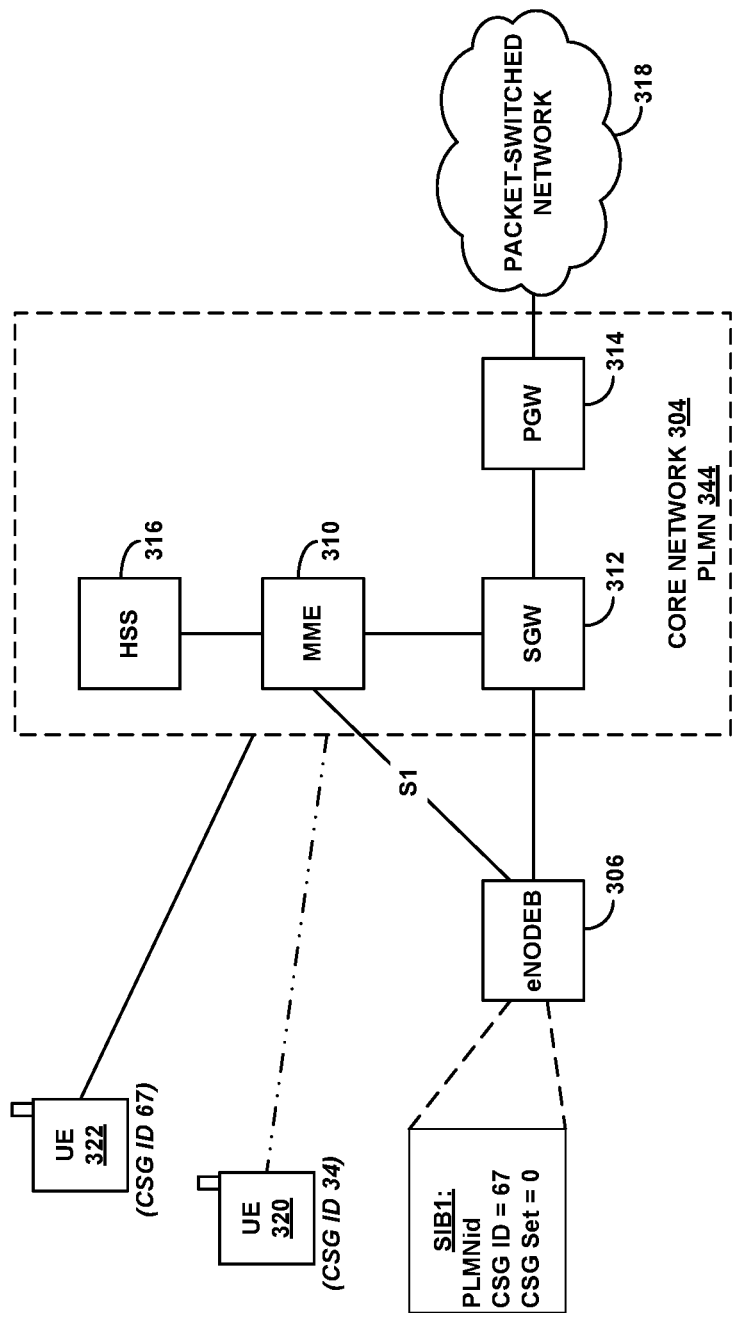
FIG. 3 is a simplified block diagram of an example communication system illustrating CSG, in which the present method can be implemented, in accordance with example embodiments.

FIG. 3 illustrates an example of CSG radio access, in accordance with example embodiment. As shown, an eNodeB 306 has an S1 interface connection on the control plane to an MME 310 in a core network 304 of a PLMN 344. The MME is also connected to an HSS 316 in the core network. The eNodeB 306 also has a user-plane connection to a SGW 312, which is connected to a PGW 314, and which provides connectivity to a packet-switched network 318.

By way of example, the eNodeB 306 provides cellular wireless access to UEs 320 and 322. However, under CSG, the access to the core network may be restricted according to whether or not the UEs are registered as members or subscribers of a defined group. Membership is specified according to a CSG ID that may be provided to the UE during a provisioning process in which the UE is added to (registered with) a particular group. The UE may then store the CSG ID for use when requesting a network attach. A UE may be a member of more than one group, which case the UE may store a list of CSG IDs indicating which groups it is registered with. CSG group registration information may also be recorded in the HSS for all CSG groups defined for the PLMN. This information may be consulted whenever a UE requests a network attach to the PLMN's core network.

In operation, when the eNodeB initializes with the core network, it sends an S1 setup request message to the MME. The eNodeB may include in the S1 setup request message a list of CSG IDs that it supports for CSG access. By doing so, the MME may coordinate configuration of CSG with eNodeB. With CSG configured for a given group with a given CSG ID, the eNodeB broadcasts a SIB1 that includes given CSG ID, together with the PLMNid of the PLMN.

In addition, CSG may be used in a closed mode, in which access is strictly limited to UEs that are members of the group, or hybrid mode, in which any UE served by the PLMN may gain access, but at lower priority for nonmember UEs. The SIB1 broadcast may then also include a CSG Set parameter that is set to 1 if close mode is in use, or set to 0 if hybrid mode is in use. When a UE seeks to attach to the core network, it may include its stored CSG membership information in a network attach request to the eNodeB, if the UE has stored such information—e.g, if it is a member of some CSG. In turn, the eNodeB sends an initial UE request message to the MME on the S1 interface. The eNodeB includes the UE's CSG membership information in the initial UE request message, and the MME may then determine whether or not the UE is a group member in consultation with the HSS. If the UE is a member, then it may be granted a network attach. If not, and if closed mode is in use, the UE may be denied access. If the UE is not a member and hybrid mode is in use, the UE may be granted access, but at a lower priority than group members.

In the example illustrated in FIG. 3, CSG ID of 67 is broadcast by the eNodeB 306 in the SIB1. Also by way of example, CSG Set is 0, indicating that hybrid mode is in use. Evidently, UE 322 has been provisioned with CSG ID=67, and is therefore a member of the group. As a result, it may be granted a network attach, as signified by the solid line to the core network 304. In the example, UE 320 has been provisioned with CSG ID=34, and is therefore not a group member. However, since hybrid mode is in use, UE 320 is granted access, but a lower priority than UE 322, as signified by the dashed-dotted line to the core network 304.

As mention above, according to LTE standards, the SIB1 block is configured to accommodate a list of PLMNids, but only one CSG ID. As a consequence, using CSG with RAN-sharing may be problematic, since CSG IDs are typically unique within the scope of a given PLMN. Thus, in order to use both CSG and RAN sharing together, there may need to be some form of inter-PLMN communication in order to coordinate a common CSG ID for the RAN (or base station) shared by the PLMNs. Such a coordination could potentially be cumbersome and complicated, consuming resources of all the PLMNs involved. At the same time, it may be the case that at least some of the PLMNs that are sharing, or are going to share, a RAN have not enabled CSG. For PLMNs, engaging in coordination of a common CSG ID, as well as other inter-PLMN CSG configuration operations, would be an unnecessary waste of efforts and resources, and could even further complicate the efforts of those PLMNs that have enabled CSG.

Unfortunately, in conventional operation, a RAN or base station that is or will be shared by multiple PLMNs is not able to distinguish which of the PLMNs have enabled CSG and which have not. Rather, a RAN or base station may be provisioned with a list of PLMNs that will share it, and when the RAN or base station initializes—e.g., comes online or powers on—it will send S1 setup request messages to all of the PLMNs, and include its CSG ID list of supported CSG IDs. This, in turn, may trigger the inter-PLMN coordination of a common CSG ID and/or other coordinated CSG configuration parameters and settings.

Accordingly, example embodiments disclosed herein provide for provisioning a base station or RAN with a table of PLMNs that includes a designation for each respective PLMN in the table of whether or not the respective PLMN has enabled CSG or not. Then, upon initialization or startup, for example, the base station or RAN may determine from the table whether or not to include CSG-related control and signaling in all subsequent control-plane and/or user-plane communications with the respective core networks of the respective PLMNs in the table. By doing so, the base station or RAN may relieve each PLMN that has not enabled CSG from the burdensome and complicated inter-PLMN CSG-coordination operations that they would otherwise engage in. This may therefore save efforts and resources for those PLMNs that have not enabled CSG, and simplify the efforts of those PLMNs that have enabled CSG.

FIG. 4 illustrates an example PLMN-CSG table 400, in accordance with example embodiments. As shown, the table 400 lists PLMNs 1, 2, 3, 4, and 5, with an associated CSG enabled status indicator for each PLMN in the table. By way of example, PLMNs 1 3 and 4 have enabled CSG, while PLMNs 2 and 5 have not. The RAN or base station, such as eNodeB 306 may be provisioned with the table 400, and thereby make a determination to which PLMNs have enabled CSG and which have not. Based on this determination, subsequent messages to the MME of each PLMN may be configured to either include or omit CSG-related control and/or signaling. In the example of FIG. 4, CSG-related control and/or signaling may be included in base station communications to the respective MMEs in the core networks of PLMNs 1, 3, and 4, and omitted from base station communications to the respective MMEs in the core networks of PLMNs 2 and 5.

Again focusing on the example of LTE, certain specific messages may be used to illustrate message construction based on the determination of which PLMNs have enabled CSG and which have not. The specific messages considered are the S1 setup message, the initial UE message, the initial context setup request message, the e-RAB modification indication message, and the UE context modification indication message. The behavior of the eNodeB in regard to each of these messages, and based on the determination of which PLMNs have enable CSG and which have not, is discussed below. It should be appreciated that other types of networks, such as 5G networks, may involve similar or analogous signaling and control messages, and that the specific eNodeB behaviors in the LTE case could be extended and/or adapted to any one of these or other types of networks.

S1 setup request message. The S1 setup request message is sent from the eNodeB to the MME to establish the S1 interface on the control plane. The eNodeB may optionally include a CSG ID list of CSGs it supports. In accordance with example embodiments, the eNodeB may either include or omit the CSG ID list in the S1 setup request message, based on the eNodeB's determination of whether or not the PLMN to which the eNodeB is directing the S1 setup request message has enabled CSG. Specifically, if the eNodeB determines that the PLMN has enabled CSG, then the eNodeB will include the CSG ID list in the S1 setup request message to the MME in the core network of the PLMN. If the eNodeB determines that the PLMN has not enabled CSG, then the eNodeB will omit the CSG ID list from the S1 setup request message to the MME in the core network of the PLMN. As described, the eNodeB may make the determination by consulting the PLMN-CSG table.

Initial UE message. The initial UE message is sent from the eNodeB to the MME on the S1 interface of the control plane in response to an attach request received by the eNodeB from a UE. The eNodeB may optionally include in the initial UE message a CSG ID of a CSG supported by the eNodeB if the eNodeB is operating in one of the CSG modes. If the eNodeB is operating in hybrid mode, it may further include the cell access mode in the initial UE message. In accordance with example embodiments, the eNodeB may either include or omit the CSG ID in the initial UE message, based on the eNodeB's determination of whether or not the PLMN to which the eNodeB is directing the initial UE message has enabled CSG. Specifically, if the eNodeB determines that the PLMN has enabled CSG, then the eNodeB will include the CSG ID. If the eNodeB determines that the PLMN has not enabled CSG, then the eNodeB will omit the CSG ID. Again, the eNodeB may make the determination by consulting the PLMN-CSG table.

Initial context setup request message. The initial context setup request message is sent from the MME to the eNodeB as part of the process of establishing a network attach for a given UE. If the initial context setup request message does not include a CSG membership status information element, and the eNodeB is operating as a hybrid cell, then the eNodeB responds with an initial context setup failure message. In accordance with example embodiments, the eNodeB may alter its behavior, based on the eNodeB's determination of whether or not the PLMN from which the eNodeB receives the initial context setup request message has enabled CSG. Specifically, if the eNodeB determines that the PLMN has enabled CSG, then the eNodeB will send an initial context setup failure message. If the eNodeB determines that the PLMN has not enabled CSG, then the eNodeB will send an initial context setup response message. Once more, the eNodeB may make the determination by consulting the PLMN-CSG table.

e-RAB modification indication message. The e-RAB modification indication message is sent from the eNodeB to the MME on the S1 interface of the control plane to modify an existing radio bearer for a UE serviced by the eNodeB. The eNodeB may optionally include in the e-RAB modification indication message CSG membership information for the UE if the eNodeB is operating in one of the CSG modes. In accordance with example embodiments, the eNodeB may either include or omit the CSG membership information in the e-RAB modification indication message, based on the eNodeB's determination of whether or not the PLMN to which the eNodeB is directing the e-RAB modification indication message has enabled CSG. Specifically, if the eNodeB determines that the PLMN has enabled CSG, then the eNodeB will include the CSG membership information. If the eNodeB determines that the PLMN has not enabled CSG, then the eNodeB will omit the CSG membership information. As before, the eNodeB may make the determination by consulting the PLMN-CSG table.

UE context modification indication message. The UE context modification indication message is sent from the eNodeB to the MME on the S1 interface of the control plane to modify an existing context for a UE serviced by the eNodeB. The eNodeB may optionally include in the UE context modification indication message CSG membership information for the UE if the eNodeB is operating in one of the CSG modes. In accordance with example embodiments, the eNodeB may either include or omit the CSG membership information in the UE context modification indication message, based on the eNodeB's determination of whether or not the PLMN to which the eNodeB is directing the UE context modification indication message has enabled CSG. Specifically, if the eNodeB determines that the PLMN has enabled CSG, then the eNodeB will include the CSG membership information. If the eNodeB determines that the PLMN has not enabled CSG, then the eNodeB will omit the CSG membership information. As before, the eNodeB may make the determination by consulting the PLMN-CSG table.

As mentioned above, another form of radio access involving making a previously restricted RF band available for cellular service is CBRS. Under CBRS, currently authorized or "incumbent" users of the RF band may be guaranteed continued interference-free access, while two new tiers of access may be granted to qualified applicants. Specifically, "priority access licenses" or PALs may be assigned in a competitive bidding process, and "general authorized access" may be granted access to unassigned portions of the band and/or on an opportunistic basis. CBRS provides for a shared PLMNid that can be used for operators that do not have their own PLMNid. In this case, the CSG ID is repurposed as a network ID, allowing operators to be distinguished while otherwise sharing a common PLMNid. As such, CBRS presents a similar issue of RAN sharing with CSG. Namely, causing inter-operator coordination of CSG ID in RAN sharing scenarios. As such, the use of CBRS with CSG may be similarly addressed by applying the methods and techniques described above. That is, a PLMN-CSG table may be used to determine which PLMNs have enabled CSG and which have not. The determination may be used as described above to avoid CSG-related signaling and configuration for those PLMNs that have not enabled CSG.

Figure 5:
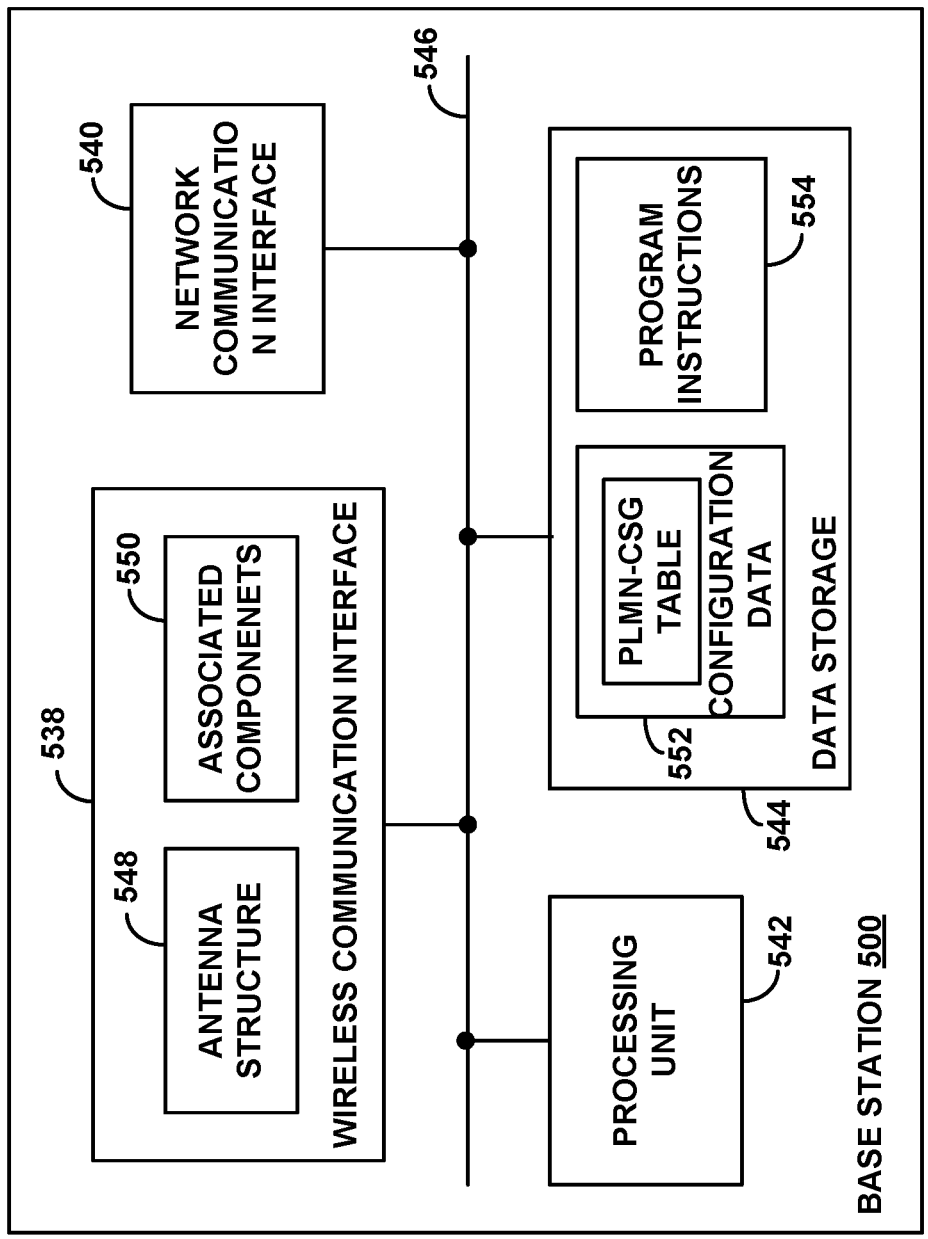
FIG. 5 is simplified block diagram of an example base station operable in accordance with example embodiments.

FIG. 5 is next a simplified block diagram of a base station 500, showing some of the components that may be included in the base station to facilitate implementation of the present method. By way of example, this figure could represent components of the eNodeB 106, 108, and/or 202, to carry out features such as those described above. The base station 500 could be a macro base station deployed as part of cellular wireless service provider's network, or a micro or femto base station configured for operation in a private dwelling or small public venue, such as a mall, airport, or sports stadium, for example.

As shown in FIG. 5, the base station 500 may include a wireless communication interface 538, a network communication interface 540, a processing unit 542, and data storage 544, all of which may be coupled together by a system bus, network or other connection mechanism 546. Although these components are shown as discrete blocks in the figure, they may be integrated together or distributed to various extents.

As shown, wireless communication interface 538 may comprise an antenna structure 548, which may be tower mounted for a macro base station, and associated components 550, for engaging in air interface communication with mobile terminals. Alternatively, the antenna 548 could be a small RF access component in a table top device, or small distributed antenna components placed at various locations in a building, mall, or passenger commuting terminal. Network communication interface 540 may then comprise an Ethernet or other module providing for connectivity through which to communicate with other base stations and/or with other components of the communication system. Processing unit 542 may then comprise one or more general purpose processors (e.g., microprocessors) and/or special-purpose processors (e.g., digital signal processors and/or application specific integrated circuits). And data storage 544 may comprise one or more volatile and/or non-volatile storage components.

As shown, data storage 544 may hold configuration data 552 and program instructions 554, although the configuration data could alternatively be incorporated in the program instructions as program logic defining access control rules. As shown, the configuration data 552 of the base station optimally comprises a PLMN-CSG table, such as the table 400 of FIG. 4.

The program instructions 554 may then be executable by the processing unit 542 to carry out various base station functions described herein. As such, the processing unit with these instructions may define a controller element of the base station, configured to carry out the described functions.

For instance, the controller may be configured to read the PLMN-CSG table upon startup, and establish control plane interfaces (e.g., S1 interfaces) with each PLMN listed in the table and according to whether or not each has enabled CSG. Alternatively, some or all aspects of this controller element of the base station could be provided in a form other than a programmed processing unit.

Figure 6:
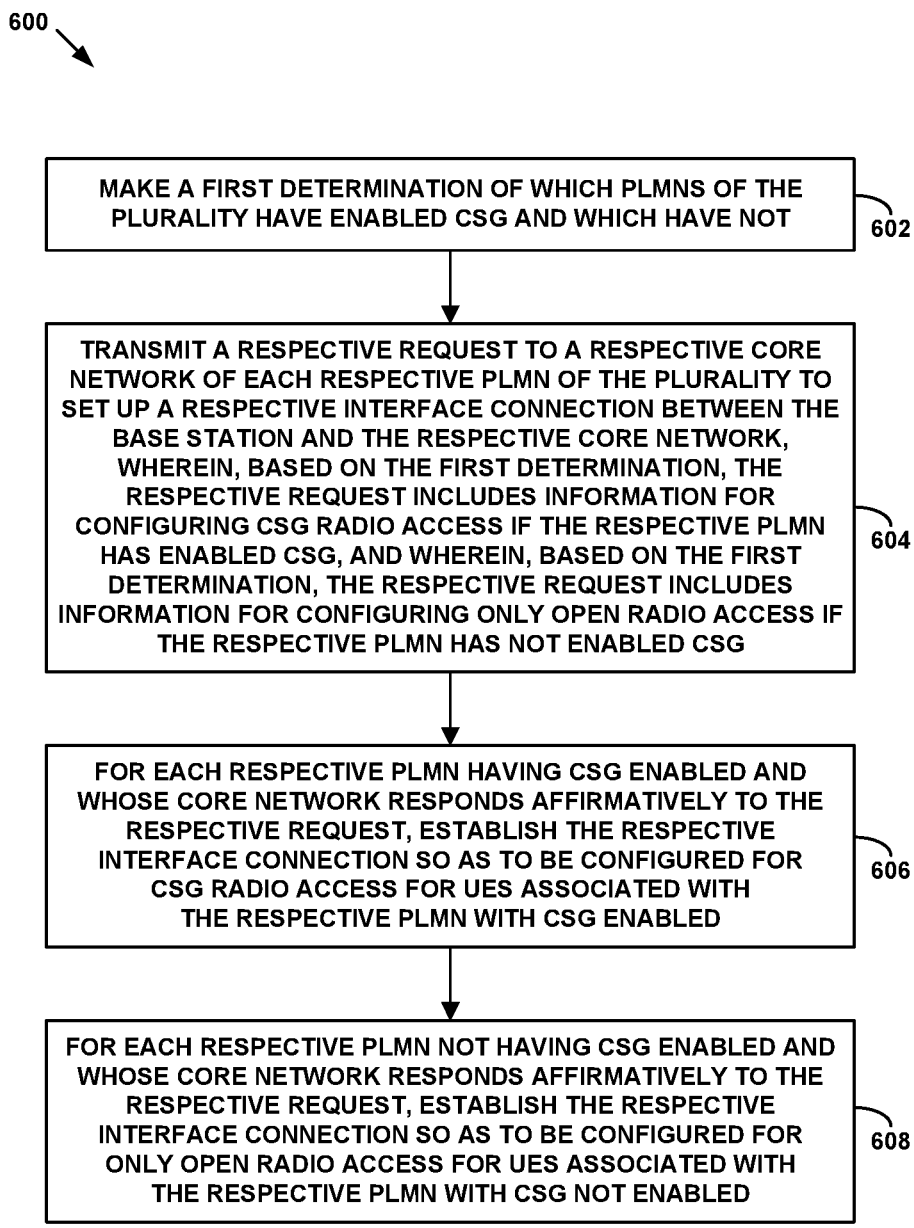
FIG. 6 is a flow chart depicting an example method, in accordance with example embodiments.

Finally, FIG. 6 is a flow chart illustrating an example method 600 of PLMN-aware RAN sharing, in accordance with example embodiments. The example method may be implemented as computer-readable instructions stored in memory of a base station, such as the base station 500 or eNodeB 106, 108, and/or 202. When executed by one or more processors of the base station, the instructions may cause base station to carry out various steps of the example method. Further, the computer-readable instructions may also be stored on a non-transitory computer-readable medium, which may be used, for example, for distribution and/or installation or provisioning of the instructions into one or more base stations.

In an example embodiment, the base station may be configured for sharing among a plurality of public land mobile networks (PLMNs). The base station may further be configured for providing at least one of open radio access or closed subscriber group (CSG) radio access for one or more user equipment devices (UEs) within its wireless coverage area.

At block 502, the example method 500 may involve the base station making a first determination of which PLMNs of the plurality have enabled CSG and which have not.

At block 504, the example method 500 may involve the base station transmitting a respective request to a respective core network of each respective PLMN of the plurality to set up a respective interface connection between the base station and the respective core network. In accordance with example embodiments, based on the first determination, the respective request may include information for configuring CSG radio access if the respective PLMN has enabled CSG. Additionally, based on the first determination, the respective request may include information for configuring only open radio access if the respective PLMN has not enabled CSG.

At block 506, the example method 500 may involve, for each respective PLMN having CSG enabled and whose core network responds affirmatively to the respective request, establishing the respective interface connection so as to be configured for CSG radio access for UEs associated with the respective PLMN with CSG enabled.

Finally, at block 508, the example method 500 may involve, for each respective PLMN not having CSG enabled and whose core network responds affirmatively to the respective request, establishing the respective interface connection so as to be configured for only open radio access for UEs associated with the respective PLMN with CSG not enabled.

In accordance with example embodiments, the BS may be provisioned with a table listing the plurality of PLMNs, and including for each respective PLMN both an associated PLMNid identifying the respective PLMN, and an associated indicator indicating whether or not CSG has been enabled for the respective PLMN. With this arrangement, making the first determination may entail performing a table look-up for each respective PLMN listed in the table.

In accordance with example embodiments, the respective interface connection between the base station and the respective core network may be a respective control-plane connection between the base station and a control-plane entity of the respective core network. Further, the information for configuring CSG radio access if the respective PLMN has enabled CSG may be information that includes parameters for controlling CSG radio access, while the information for configuring only open radio access if the respective PLMN has not enabled CSG may be information that omits parameters for controlling CSG radio access. With this arrangement, establishing the respective interface connection so as to be configured for CSG radio access for UEs associated with the respective PLMN with CSG enabled may entail establishing the respective control-plane interface connection for controlling CSG radio access for UEs associated with respective PLMN with CSG enabled. Correspondingly, establishing the respective interface connection so as to be configured for only open radio access for UEs associated with respective PLMN with CSG not enabled may entail establishing the respective control-plane interface connection for controlling open radio access for UEs associated with respective PLMN with CSG not enabled.

In further accordance with example embodiments, the base station and all of the plurality of PLMNs may operate according to long term evolution (LTE), with each of the PLMNs being identified by a respective PLMNid. In this arrangement, the respective interface connection may a respective S1 interface connection between the base station and a respective mobility management entity (MME) in each respective core network. Accordingly, transmitting the respective request to the respective core network of each respective PLMN may entail transmitting a respective S1 setup request that includes the respective PLMNid of the respective PLMN, where the first determination is used as a basis for information in the request. Specifically, based on the first determination, the respective S1 setup request may further include a CSG ID list of one or more CSG identifiers (CSG IDs) supported by the base station, if the respective PLMN has enabled CSG, and conversely, based on the first determination, the respective S1 setup request may omit the CSG ID list, if the respective PLMN has not enabled CSG. Accordingly, the first determination may also be used as a basis in establishing the respective interface connection. Specifically, based on the first determination, establishing the respective interface connection so as to be configured for CSG radio access comprises may entail establishing the respective S1 interface connection for controlling CSG radio access for UEs associated with the respective PLMN with CSG enabled, and establishing the respective interface connection so as to be configured for only open radio access comprises may entail establishing the respective S1 interface connection for controlling open radio access for UEs associated with the respective PLMN with CSG not enabled.

In accordance with example embodiments, the example method may further entail receiving an attach request message from a particular UE associated with a given PLMN of the plurality that has enabled CSG and that has an established respective S1 interface connection with the base station via the respective MME of the respective core network of the given PLMN. Then, based on the first determination, the base station may respond to the attach request message by transmitting to the respective MME an initial UE message that includes a CSG ID.

Also in accordance with example embodiments, the example method may further entail receiving an attach request message from a particular UE associated with a given PLMN of the plurality that has not enabled CSG and that has an established respective S1 interface connection with the base station via the respective MME of the respective core network of the given PLMN. Then, based on the first determination, the base station may respond to the attach request message by transmitting to the respective MME an initial UE message that omits a CSG ID.

In further accordance with example embodiments, the base station may be further configured for providing CSG radio access in one of closed mode or hybrid mode. In this case, the example method may further entail receiving an initial context setup message from the respective MME of the respective core network of a given PLMN of the plurality that has an established respective S1 interface connection with the base station via the respective MME. In particular the initial context setup message may be associated with an attach request to the base station from a particular UE seeking to attach to the respective core network of the given PLMN, and the base station may determine that the initial context setup message does not include a CSG membership status indicator. In this case, based on the first determination, the base station may transmit an initial context setup failure message to the respective MME, if the base station is providing hybrid mode CSG radio access for UEs associated with the given PLMN. Conversely, and also based on the first determination, the base station, after establishing a radio bearer for the particular UE on a user plane, may transmit an initial context response message to the respective MME, if the base station is providing open radio access for UEs associated with the given PLMN.

In accordance with example embodiments, the example method may further entail the base station transmitting an e-RAB modification indication message to the respective MME of a given PLMN of the plurality that has an established respective S1 interface connection with the base station via the respective MME, where the e-RAB modification indication message is associated with a particular UE having a previously established radio bearer with the given PLMN. In this case, based on the first determination, the e-RAB modification indication message may include a CSG membership information for the particular UE, including a CSG ID and a PLMNid of the given PLMN, if the given PLMN has enabled CSG. Conversely, and also based on the first determination, the e-RAB modification indication message for the particular UE may omit any CSG ID and PLMNid, if the given PLMN has not enabled CSG.

In accordance with example embodiments, the example method may further entail the base station transmitting a UE context modification indication message to the respective MME of a given PLMN of the plurality that has an established respective S1 interface connection with the base station via the respective MME, where the UE context modification indication message is associated with a particular UE having a previously context with the given PLMN. In this case, based on the first determination, the context modification indication message may further include a CSG membership information for the particular UE, including a CSG ID and a PLMNid of the given PLMN, if the given PLMN has enabled CSG. Conversely, and based on the first determination, the context modification indication message for the particular UE may omit any CSG ID and PLMNid, if the given PLMN has not enabled CSG.

In further accordance with example embodiments, the base station may be further configured for providing citizens broadband radio service to UEs within its wireless coverage area.

Exemplary embodiments have been described above. It should be understood, however, that variations from these embodiments are possible, while remaining within the true spirit and scope of the invention.

We claim:

1. In a base station (BS) configured for sharing among a plurality of public land mobile networks (PLMNs) that operate according to long term evolution (LTE), wherein each of the PLMNs is identified by a respective PLMNid, and further configured for providing at least one of open radio access or closed subscriber group (CSG) radio access for one or more user equipment devices (UEs) within its wireless coverage area, and for providing CSG radio access in one of closed mode or hybrid mode, a method comprising:

making a first determination of which PLMNs of the plurality have enabled CSG and which have not, wherein the first determination is based on PLMN information stored at the BS;

transmitting a respective request to a respective core network of each respective PLMN of the plurality to set up a respective control-plane interface connection between the base station and the respective core network, wherein, based on the first determination, the respective request includes information for configuring CSG radio access if the respective PLMN has enabled CSG, and wherein, based on the first determination, the respective request includes information for configuring only open radio access if the respective PLMN has not enabled CSG;

for each respective PLMN having CSG enabled and whose core network responds affirmatively to the respective request, establishing the respective control-plane interface connection so as to be configured for CSG radio access for UEs associated with the respective PLMN with CSG enabled; and for each respective PLMN not having CSG enabled and whose core network responds affirmatively to the respective request, establishing the respective control-plane interface connection so as to be configured for only open radio access for UEs associated with the respective PLMN with CSG not enabled, wherein the respective control-plane interface connection is a respective S1 interface connection between the base station and a respective mobility management entity (MME) in each respective core network, wherein transmitting the respective request to the respective core network of each respective PLMN comprises transmitting a respective S1 setup request that includes the respective PLMNid of the respective PLMN, wherein, based on the first determination, the respective S1 setup request further includes a CSG ID list of one or more CSG identifiers (CSG IDs) supported by the base station, if the respective PLMN has enabled CSG;

and wherein, based on the first determination, the respective S1 setup request omits the CSG ID list, if the respective PLMN has not enabled CSG;

wherein establishing the respective control-plane interface connection so as to be configured for CSG radio access comprises, based on the first determination, establishing the respective S1 interface connection for controlling CSG radio access for UEs associated with the respective PLMN with CSG enabled, and wherein establishing the respective control-plane interface connection so as to be configured for only open radio access comprises, based on the first determination, establishing the respective S1 interface connection for controlling open radio access for UEs associated with the respective PLMN with CSG not enabled, and wherein the method further comprises:
receiving an initial context setup message from the respective MME of the respective core network of a given PLMN of the plurality that has an established S1 interface connection with the base station via the respective MME, wherein the initial context setup message is associated with an attach request to the base station from a particular UE seeking to attach to the respective core network of the given PLMN;
based on the first determination, transmitting an initial context setup failure message to the respective MME, when both the initial context setup message does not include a CSG membership status indicator, and the base station is providing hybrid mode CSG radio access for UEs associated with the given PLMN; and
based on the first determination, and after establishing a radio bearer for the particular UE on a user plane, transmitting an initial context response message to the respective MME, when both the initial context setup message does not include a CSG membership status indicator, and the base station is providing open radio access for UEs associated with the given PLMN.

2. The method of claim 1, wherein the PLMN information stored at BS comprises a table listing the plurality of PLMNs, and including for each respective PLMN both its respective PLMNid, and an associated indicator indicating whether or not CSG has been enabled for the respective PLMN,
and wherein making the first determination comprises performing a table look-up for each respective PLMN listed in the table.

3. The method of claim 1,
wherein the information for configuring CSG radio access if the respective PLMN has enabled CSG comprises information including parameters for controlling CSG radio access,
and wherein the information for configuring only open radio access if the respective PLMN has not enabled CSG comprises information omitting parameters for controlling CSG radio access.

4. The method of claim 1, further comprising:
receiving the attach message from the particular UE; and
based on the first determination, responding to the attach request by transmitting to the respective MME an initial UE message that includes a CSG ID.

5. The method of claim 1, further comprising:
receiving the attach request from the particular UE; and
based on the first determination, responding to the attach request by transmitting to the respective MME an initial UE message that omits a CSG ID.

6. The method of claim 1, further comprising:
transmitting an e-RAB modification indication message to the respective MME of a particular PLMN of the plurality that has an established respective S1 interface connection with the base station via the respective MME, wherein the e-RAB modification indication message is associated with a given UE having a previously established radio bearer with the particular PLMN,
wherein, based on the first determination, the e-RAB modification indication message further includes a CSG membership information for the given UE, including a CSG ID and a PLMNid of the particular PLMN, if the particular PLMN has enabled CSG,
and wherein, based on the first determination, the e-RAB modification indication message for the given UE omits any CSG ID and PLMNid, if the particular PLMN has not enabled CSG.

7. The method of claim 1, further comprising:
transmitting a UE context modification indication message to the respective MME of a particular PLMN of the plurality that has an established respective S1 interface connection with the base station via the respective MME, wherein the UE context modification indication message is associated with a given UE having a previously context with the particular PLMN,
wherein, based on the first determination, the context modification indication message further includes a CSG membership information for the given UE, including a CSG ID and a PLMNid of the particular PLMN, if the particular PLMN has enabled CSG,
and wherein, based on the first determination, the context modification indication message for the given UE omits any CSG ID and PLMNid, if the particular PLMN has not enabled CSG.

8. The method of claim 1, wherein the base station is further configured for providing citizens broadband radio service to UEs within its wireless coverage area.

9. A base station (BS) configured for sharing among a plurality of public land mobile networks (PLMNs) that operate according to long term evolution (LTE), wherein each of the PLMNs is identified by a respective PLMNid, and further configured for providing at least one of open radio access or closed subscriber group (CSG) radio access for one or more user equipment devices (UEs) within its wireless coverage area, and for providing CSG radio access in one of closed mode or hybrid mode, the base station comprising:
an antenna structure configured to communicate over an air interface with the one or more UEs;
one or more processors;
and memory storing instructions that, when executed by the one or more processors, cause the base station to carry out operations including:
making a first determination of which PLMNs of the plurality have enabled CSG and which have not, wherein the first determination is based on PLMN information stored at the BS;
transmitting a respective request to a respective core network of each respective PLMN of the plurality to set up a respective control-plane interface connection between the base station and the respective core network, wherein, based on the first determination, the respective request includes information for configuring CSG radio access if the respective PLMN has enabled CSG, and wherein, based on the first determination, the respective request includes information for configuring only open radio access if the respective PLMN has not enabled CSG;
for each respective PLMN having CSG enabled and whose core network responds affirmatively to the respective request, establishing the respective control-plane interface connection so as to be configured for CSG radio access for UEs associated with the respective PLMN with CSG enabled; and
for each respective PLMN not having CSG enabled and whose core network responds affirmatively to the respective request, establishing the respective control-plane interface connection so as to be configured for only open radio access for UEs associated with the respective PLMN with CSG not enabled,
wherein the respective control-plane interface connection is a respective S1 interface connection between the base station and a respective mobility management entity (MME) in each respective core network, wherein transmitting the respective request to the respective core network of each respective PLMN comprises transmitting a respective S1 setup request that includes the respective PLMNid of the respective PLMN, wherein, based on the first determination, the respective S1 setup request further includes a CSG ID list of one or more CSG identifiers (CSG IDs) supported by the base station, if the respective PLMN has enabled CSG, and wherein, based on the first determination, the respective S1 setup request omits the CSG ID list, if the respective PLMN has not enabled CSG;

wherein establishing the respective control-plane interface connection so as to be configured for CSG radio access comprises, based on the first determination, establishing the respective S1 interface connection for controlling CSG radio access for UEs associated with the respective PLMN with CSG enabled, and wherein establishing the respective control-plane interface connection so as to be configured for only open radio access comprises, based on the first determination, establishing the respective S1 interface connection for controlling open radio access for UEs associated with the respective PLMN with CSG not enabled, and wherein the operations further include:

receiving an initial context setup message from the respective MME of the respective core network of a given PLMN of the plurality that has an established S1 interface connection with the base station via the respective MME, wherein the initial context setup message is associated with an attach request to the base station from a particular UE seeking to attach to the respective core network of the given PLMN;

based on the first determination, transmitting an initial context setup failure message to the respective MME, when both the initial context setup message does not include a CSG membership status indicator, and the base station is providing hybrid mode CSG radio access for UEs associated with the given PLMN; and based on the first determination, and after establishing a radio bearer for the particular UE on a user plane, transmitting an initial context response message to the respective MME, when both the initial context setup message does not include a CSG membership status indicator, and the base station is providing open radio access for UEs associated with the given PLMN.

10. The base station of claim 9, wherein the PLMN information stored at BS comprises a table listing the plurality of PLMNs, and including for each respective PLMN both its respective PLMNid, and an associated indicator indicating whether or not CSG has been enabled for the respective PLMN, and wherein making the first determination comprises performing a table look-up for each respective PLMN listed in the table.

11. The base station of claim 9, wherein the information for configuring CSG radio access if the respective PLMN has enabled CSG comprises information including parameters for controlling CSG radio access, and wherein the information for configuring only open radio access if the respective PLMN has not enabled CSG comprises information omitting parameters for controlling CSG radio access.

12. The base station of claim 9, wherein the operations further include:

receiving the attach message from the particular UE; and based on the first determination, responding to the attach request by transmitting to the respective MME an initial UE message that includes a CSG ID.

13. The base station of claim 9, wherein the operations further include:

receiving the attach request from the particular UE; and based on the first determination, responding to the attach request by transmitting to the respective MME an initial UE message that omits a CSG ID.

14. The base station of claim 9, wherein the operations further include:

transmitting an e-RAB modification indication message to the respective MME of a particular PLMN of the plurality that has an established respective S1 interface connection with the base station via the respective MME, wherein the e-RAB modification indication message is associated with a given UE having a previously established radio bearer with the particular PLMN, wherein, based on the first determination, the e-RAB modification indication message further includes a CSG membership information for the given UE, including a CSG ID and a PLMNid of the particular PLMN, if the particular PLMN has enabled CSG, and wherein, based on the first determination, the e-RAB modification indication message for the given UE omits any CSG ID and PLMNid, if the particular PLMN has not enabled CSG.

15. The base station of claim 9, wherein the operations further include:

transmitting a UE context modification indication message to the respective MME of a particular PLMN of the plurality that has an established respective S1 interface connection with the base station via the respective MME, wherein the UE context modification indication message is associated with a given UE having a previously context with the particular PLMN, wherein, based on the first determination, the context modification indication message further includes a CSG membership information for the given UE, including a CSG ID and a PLMNid of the particular PLMN, if the particular PLMN has enabled CSG, and wherein, based on the first determination, the context modification indication message for the given UE omits any CSG ID and PLMNid, if the particular PLMN has not enabled CSG.

16. A non-transitory computer-readable medium having instructions stored thereon that when executed by one or more processors of a base station (BS) configured for sharing among a plurality of public land mobile networks (PLMNs) that operate according to long term evolution (LTE), wherein each of the PLMNs is identified by a respective PLMNid, and further configured for providing at least one of open radio access or closed subscriber group (CSG) radio access for one or more user equipment devices (UEs) within its wireless coverage area, and for providing CSG radio access in one of closed mode or hybrid mode, cause the base station to carry out operations including:

making a first determination of which PLMNs of the plurality have enabled CSG and which have not, wherein the first determination is based on PLMN information stored at the BS;

transmitting a respective request to a respective core network of each respective PLMN of the plurality to set up a respective control-plane interface connection between the base station and the respective core network, wherein, based on the first determination, the respective request includes information for configuring CSG radio access if the respective PLMN has enabled CSG, and wherein, based on the first determination, the respective request includes information for configuring only open radio access if the respective PLMN has not enabled CSG;

for each respective PLMN having CSG enabled and whose core network responds affirmatively to the respective request, establishing the respective control-plane interface connection so as to be configured for CSG radio access for UEs associated with the respective PLMN with CSG enabled; and for each respective PLMN not having CSG enabled and whose core network responds affirmatively to the respective request, establishing the respective control-plane interface connection so as to be configured for only open radio access for UEs associated with the respective PLMN with CSG not enabled, wherein the respective control-plane interface connection is a respective S1 interface connection between the base station and a respective mobility management entity (MME) in each respective core network, wherein transmitting the respective request to the respective core network of each respective PLMN comprises transmitting a respective S1 setup request that includes the respective PLMNid of the respective PLMN, wherein, based on the first determination, the respective S1 setup request further includes a CSG ID list of one or more CSG identifiers (CSG IDs) supported by the base station, if the respective PLMN has enabled CSG, and wherein, based on the first determination, the respective S1 setup request omits the CSG ID list, if the respective PLMN has not enabled CSG;

wherein establishing the respective control-plane interface connection so as to be configured for CSG radio access comprises, based on the first determination, establishing the respective S1 interface connection for controlling CSG radio access for UEs associated with the respective PLMN with CSG enabled, and wherein establishing the respective control-plane interface connection so as to be configured for only open radio access comprises, based on the first determination, establishing the respective S1 interface connection for controlling open radio access for UEs associated with the respective PLMN with CSG not enabled, and wherein the operations further include:

receiving an initial context setup message from the respective MME of the respective core network of a given PLMN of the plurality that has an established S1 interface connection with the base station via the respective MME, wherein the initial context setup message is associated with an attach request to the base station from a particular UE seeking to attach to the respective core network of the given PLMN;

based on the first determination, transmitting an initial context setup failure message to the respective MME, when both the initial context setup message does not include a CSG membership status indicator, and the base station is providing hybrid mode CSG radio access for UEs associated with the given PLMN; and based on the first determination, and after establishing a radio bearer for the particular UE on a user plane, transmitting an initial context response message to the respective MME, when both the initial context setup message does not include a CSG membership status indicator, and the base station is providing open radio access for UEs associated with the given PLMN.

\* \* \* \* \*